(12) United States Patent
Yao et al.

(10) Patent No.: US 11,188,794 B2
(45) Date of Patent: Nov. 30, 2021

(54) CONVOLUTIONAL NEURAL NETWORK FRAMEWORK USING REVERSE CONNECTIONS AND OBJECTNESS PRIORS FOR OBJECT DETECTION

(71) Applicant: INTEL CORPORATION, Santa Clara, CA (US)

(72) Inventors: Anbang Yao, Beijing (CN); Tao Kong, Beijing (CN); Ming Lu, Beijing (CN); Yiwen Guo, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 16/630,419

(22) PCT Filed: Aug. 10, 2017

(86) PCT No.: PCT/CN2017/096755
§ 371 (c)(1),
(2) Date: Jan. 10, 2020

(87) PCT Pub. No.: WO2019/028725
PCT Pub. Date: Feb. 14, 2019

(65) Prior Publication Data
US 2020/0143205 A1    May 7, 2020

(51) Int. Cl.
*G06K 9/62*  (2006.01)
*G06K 9/20*  (2006.01)
(Continued)

(52) U.S. Cl.
CPC ......... *G06K 9/6262* (2013.01); *G06K 9/2054* (2013.01); *G06K 9/6232* (2013.01); *G06N 3/04* (2013.01); *G06N 3/08* (2013.01)

(58) Field of Classification Search
CPC .. G06K 9/6262; G06K 9/2054; G06K 9/6232; G06K 9/6271; G06K 9/00624; G06N 3/04; G06N 3/08
(Continued)

(56) References Cited

U.S. PATENT DOCUMENTS

| 2008/0089579 | A1* | 4/2008 | Han | G06K 9/6256 382/159 |
| 2018/0096457 | A1* | 4/2018 | Savvides | G06F 16/50 |
| 2021/0150268 | A1* | 5/2021 | Wang | G06N 3/08 |

FOREIGN PATENT DOCUMENTS

| CN | 106570453 | | 4/2017 | |
| CN | 106570453 A | * | 4/2017 | ......... G06K 9/00778 |

(Continued)

OTHER PUBLICATIONS

International Searching Authority, "Search Report and Written Opinion," issued in connection with Patent Application No. PCT/CN2017/096755, dated May 9, 2018, 8 pages.
(Continued)

*Primary Examiner* — Juan A Torres
(74) *Attorney, Agent, or Firm* — Hanley, Flight & Zimmerman, LLC

(57) ABSTRACT

A convolutional neural network framework is described that uses reverse connection and obviousness priors for object detection. A method includes performing a plurality of layers of convolutions and reverse connections on a received image to generate a plurality of feature maps, determining an objectness confidence for candidate bounding boxes based on outputs of an objectness prior, determining a joint loss function for each candidate bounding box by combining an objectness loss, a bounding box regression loss and a classification loss, calculating network gradients over positive boxes and negative boxes, updating network parameters within candidate bounding boxes using the joint loss func-
(Continued)

tion, repeating performing the convolutions through to updating network parameters until the training converges, and outputting network parameters for object detection based on the training images.

20 Claims, 7 Drawing Sheets

(51) Int. Cl.
*G06N 3/04* (2006.01)
*G06N 3/08* (2006.01)

(58) Field of Classification Search
USPC .......................................................... 382/103
See application file for complete search history.

(56) References Cited

FOREIGN PATENT DOCUMENTS

CN     106682697        5/2017
CN     106682697 A  *   5/2017   ........... G06K 9/6256

OTHER PUBLICATIONS

International Bureau, "International Preliminary Report on Patentability," issued in connection with Patent Application No. PCT/CN2017/096755, dated Feb. 11, 2020, 5 pages.

\* cited by examiner

CONVOLUTIONAL NEURAL NETWORK FRAMEWORK USING REVERSE CONNECTIONS AND OBJECTNESS PRIORS FOR OBJECT DETECTION

PRIORITY

This application is a U.S. National Phase application under 35 U.S.C. § 371 of International Application No. PCT/CN2017/096755 filed Aug. 10, 2017, which is hereby incorporated by reference and commonly assigned.

FIELD

The present description relates to the field of object detection for machine vision or image understanding and, in particular, to a convolutional neural network framework using reverse connections and objectness priors.

BACKGROUND

Many computers, personal devices, wearables, and other computing systems include image or video capture or are equipped to process images or video. With the proliferation of digital cameras in portable, ruggedized, mounted, and desktop devices, there is a related desire to use these cameras in new ways. Some of these ways work by detecting objects that are within the camera's field of view. Once an object is identified, many different operations may be performed, depending on the categories of objects and the purpose for the system.

Generic object detection techniques automatically recognize and localize the instances of objects that appear in an image or a video frame. In many cases, the technique only detects objects that fall within particular categories or classes that are of interest for other tools. As an example, a system may recognize and localize people but not trees. The same system may also recognize and localize particular animals. An object recognition system may then classify each animal based on the type of animal. Object detection may be considered to be a fundamental task in computer vision with a broad range of different applications. These applications include scene understanding, image search, augmented reality, surveillance, autonomous driving and so on. These applications are becoming prevalent and diverse, especially on mobile devices and other devices with embedded cameras. High accuracy and high speed object detection is important in personal, home, business, professional, and industrial fields.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
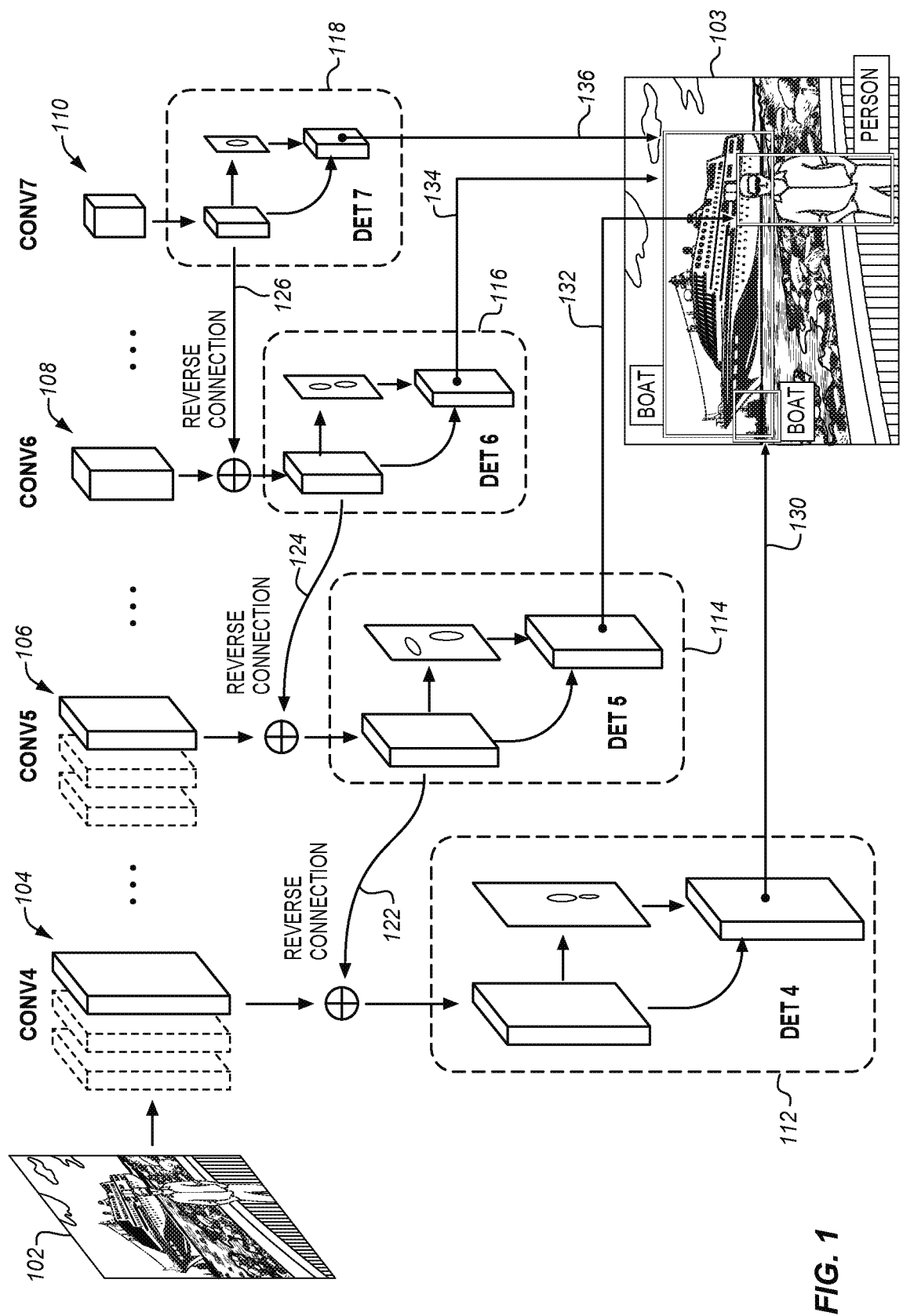
FIG. 1 is a block diagram of an example system including a convolutional neural network with reverse connections of feature maps and object detection with objectness priors according to an embodiment.

The described techniques and structures provide an efficient and accurate object detection technology with the merits of region proposal-based and region proposal free techniques. In addition many of the demerits in these approaches are avoided. The described system is faster and more accurate than many previous approaches and is able to run well on common power-constrained notebook computers that use a separate graphics processing unit.

The technique benefits from a structure referred to herein as a Reverse Connection Pyramid (RCP) architecture is used for multi-scale object localization. RCP harnesses the multi-scale feature maps from multiple layers of a pre-trained CNN (Convolutional Neural Network) model to enrich object representations. The approach may be applied to deep learning on a variety of different computing platforms that maintain appropriate hardware structures.

The technique also benefits from structure referred to herein as an Objectness Prior Network (OPN) for hard negative example scanning and mining. OPN gives an explicit guide to the searching of objects.

The technique also benefits from a technique referred to herein as a Joint Loss Function (JLF) for the optimization of the OPN and an object detection network. The JLF performs multi-task training in an end-to-end manner.

Deep Convolutional Neural Networks (CNN)-based object detection methods demonstrate leading performance compared with other earlier solutions. Many of the CNN-based object detection methods can be grouped into two categories: region proposal-based and region proposal free.

Regions with Convolutional Neural Network features (R-CNN) is an object detection method that uses selective search to first generate thousands of potential image regions by hierarchical segmentation and grouping. Then, object detection is only considered in the proposed image regions by classifying respective CNN features. There are many variations and extensions (such as Faster R-CNN and Region Proposal Network (RPN)) of this basic region-based approach. These are the primary technique for large scale object detection, but have low efficiency.

Region proposal-based object detection methods show low efficiency both in training and feed-forward inference. This is in part because a region proposal subnetwork repeatedly evaluates hundreds or thousands of region proposals to generate final proposals. It is also in part because the region proposal subnetwork and the object detection subnetwork, which are trained with complex multi-stage training processes, are not fully convolutional.

Region proposal-free methods such as You Only Look Once (YOLO) and Single Shot Detection (SSD) are much faster than region proposal-based methods and are developed for smaller computing platforms or when higher speed is required. YOLO and SSD first divide the input image into different grids and then detect objects in each grid directly with a CNN model. These approaches provide higher speed with low detection accuracy. Since region proposal free methods directly perform object detection on a large number of divided image grids, the serious imbalance (e.g., 1:10000) between the number of positive examples (annotated object boxes) and negative examples (background boxes) becomes a bottleneck for training good object detectors.

As described herein the Reverse Connection Pyramid (RCP) addresses problems of multiple scale object localization. Objects of various scales may appear at many different positions of an image. This has previously been solved using tens of thousands of regions in a single image. The regions are in groups in which each group has different positions, object scales, and aspect ratios. The RCP detects objects on each object's corresponding network scales efficiently.

The Objectness Prior Network (OPN) addresses problems of robust negative space scanning. The ratio between the number of samples that contain the object (positive) and the number of samples that do not contain an object (non-object, or negative), is seriously imbalanced. There are many more negative regions or samples than positive. So an object detector is improved by using an effective negative sample scanning and mining strategy. In order to reduce the searching space of the objects, the OPN is jointly optimized with the object detection network at a training phase through a Joint Loss Function (JLF) guided end-to-end training framework. The approach has been shown to provide leading performance on several significant object detection challenges.

FIG. 1 is a block diagram of an overview of an object detection system using the convolutional framework described herein. In this example a 20-category object detection is performed using a pre-trained model (e.g., VGG-16). The joint fully convolutional network contains three modules, as described above. These include a Reverse Connection Pyramid (RCP) for multi-scale object localization, an Objectness Prior Network (OPN) for robust negative space scanning, and an object detection network for low-cost object classification and localization. These are integrated into a unified object detection framework.

An input image 102 is processed through multiple convolutional layers 104, 106, 108, 110 for object detection. The object detection is performed in a separate module 112, 114, 116, 118 for each layer. The module includes classification and localization logic that typically operates in dedicated hardware. This hardware is added to the standard convolutional layers 104, 106, 108, 110. The result in 103 for this example is the detection of three objects: a small boat 130; a foreground person 132; and a large ship 134, 136.

The boat and the ship are small and large not in absolute size but in size within the image. The small boat takes only a few pixels of the input image 102, but may be a much larger ship that is very far away. The large ship covers a significant portion of the image in part because it is much closer. The objects are detected at different convolutional layers because of the different scales or sizes on the image. The small boat 130 is detected at convolutional layer 4 104, through an object detection 112 coupled to that layer. The person 132 is much larger in the image than the boat 130 and is detected at convolutional layer 5 106 at a corresponding object detector 114. The ship 134, 136 is still larger and is detected at both convolutional layers 6 and 7 108, 110 at two object detectors 114, 118.

Reverse Connection Pyramid

In object detection feature representations are used to discriminate any objects of interest from the background. Feature representations are also used in object classification to discriminate objects in one class from objects in a different class. Feature representations may be created as a combination of fine-grained details with highly abstracted information from a CNN model. The region proposal-based methods first fuse feature maps from multiple CNN layers into a single feature map. Next object detection is performed on the fused maps with region-wise sub-networks. Other approaches detect objects on multiple CNN layers separately. However, the semantic information of the shallow layers is very limited and the resolution of the deep layers is very coarse, which affects the detection accuracy of these layers. The described Reverse Connection Pyramid (RCP) approach allows for object localization on multiple scales. The reverse connection allows shallower features to have more semantic information.

Figure 2:
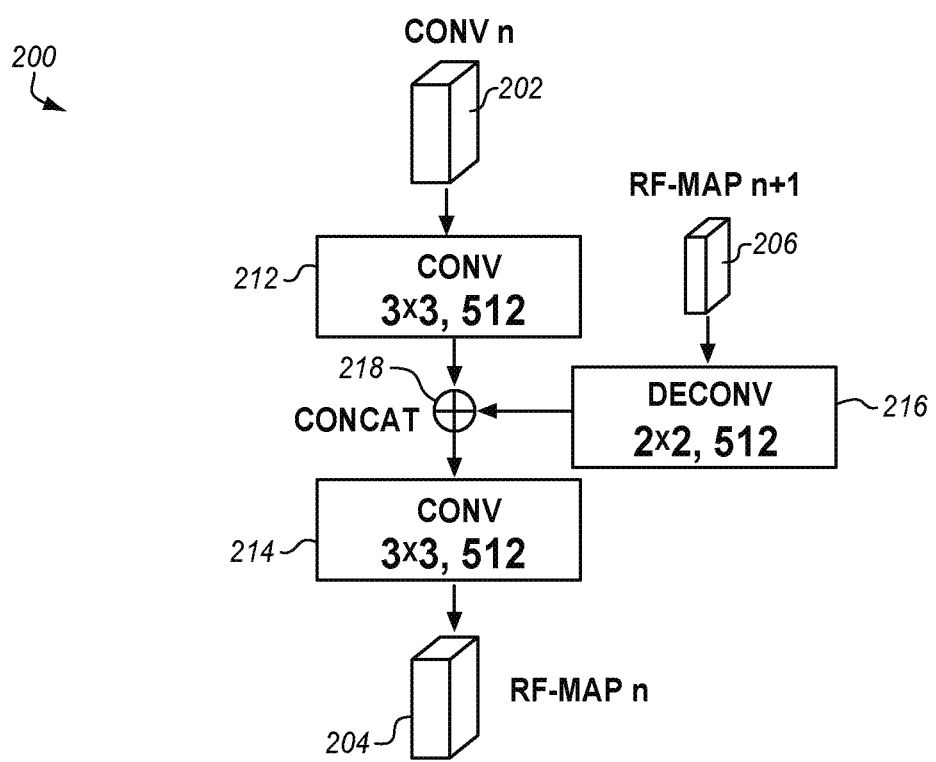
FIG. 2 is a block diagram of single reverse connection block for back feature aggregation according to an embodiment.

FIG. 2 is a diagram 200 of a single reverse connection block configured for the RCP technique. In this example a CNN structure with 15 convolutional layers is used as an example, however, the described framework may be adapted to many different structures. The illustrated example is built starting with from VGG-16 with 13 convolutional and 2 fully connected layers (FC6 and FC7). The classification layer is not used. The 2 fully connected layers are transformed to 1×1 convolution. In what follows, we use conv 6 and conv 7 to represent transformed FC6 and FC7. For the output feature maps, 2×2 convolutional kernels with stride 2 are used to reduce the resolution of FC7 by half. As a result, the feature map sizes used for object detection are ⅛ (conv 4_3), 1/16 (conv 5_3), 1/32 (conv 6) and 1/64 (conv 7) of the input image 102 size both in width and height.

The RCP technique uses reverse connection blocks that each operates in three operations. First a de-convolutional layer 216 is applied to a reverse fusion map n+1 206 (annotated as rf-map n+1), and a convolutional layer 212 is grafted on a backbone layer n 202 to guarantee that the outputs have the same dimension. Map n+1 is from the next convolutional layer, n+1, after the current convolutional layer, n.

Second, the outputs are concatenated or added element-wise 218 along the feature channel dimension.

Third, a convolutional layer 214 is applied to reduce and normalize the feature dimension and generate a feature map 204 which is a reverse fusion map for that layer designated as rf-map n.

This is the structure of the reverse connection blocks 122, 124, 126 used to construct the RCP 122, 124, 126 as shown in FIG. 1.

The reverse fusion map for example at layer 7 is the convolutional output of the backbone layer 7. Using the dimensions and pooling above, layer 7 would be sized at 512 channels by 3×3 kernels. After this layer has been generated, each reverse connection block may be generated in the same way shown in FIG. 2. These are, in effect, back aggregated through the network. The back aggregation puts a focus on feature fusion using e.g. reverse fusion maps. For convolutions 4-7 104, 106, 108, 110 there are four reverse fusion maps 122, 124, 126, 128 each one with a different scale, generating an RCP representation, as shown in FIG. 1. The reverse fusion maps are fed into each respective detection block 112, 114, 116, 118 to improve effectiveness in locating and classifying objects at each respective scale or size. Since the reverse connection is learnable, the semantic information of former layers can be significantly enriched.

Objectness Prior Network

Once the RCPs over all input images are extracted, the operation of the framework may be enhanced by scanning the negative sample space and rejecting most of the background regions in feed-forward testing. At the same time the hard negative samples are mined in training. Bounding boxes are generated using the RCPs, and then these are supplied into the Objectness Prior Network (OPN). Bounding boxes in this case refers to default box candidates. The objectness process will choose from among the candidates.

Figure 3:
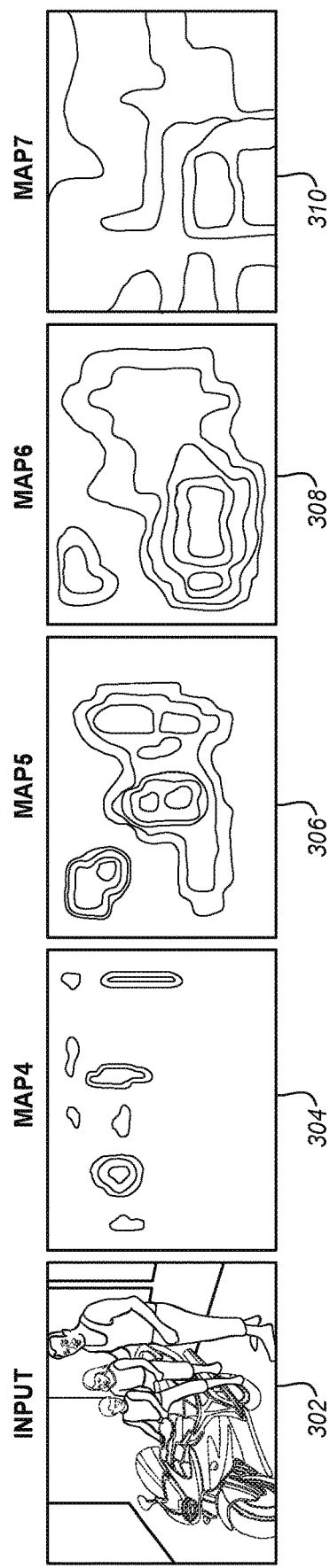
FIG. 3 is a diagram of an image and a set of objectness prior maps over reverse fusion maps at different convolutional layers according to an embodiment.

FIG. 3 is a diagram of an input image with diverse objects of different sizes and resulting example objectness prior maps generated from the image. Feature maps from different levels within a network are known to have different receptive field sizes. This is shown in that the input image 302 has two people beside a motorcycle. The first map 304, map 4, does not detect either of these but some background features. The second map 306, map 5, detects the people but not the motorcycle. The third, map 308, map 6 detects the motorcycle but is less sensitive to the people. The last map 310, map 7, detects the front fender and fairing of the motorcycle but is less sensitive to the rest of the motorcycle and the people. These are provided as examples generated from real data to show how different feature maps can operate on the same image.

Figure 4:
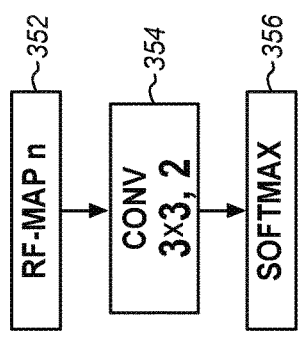
FIG. 4 is a block diagram of a sub-network for objectness prior detection according to an embodiment.

FIG. 4 is a block diagram of an objectness prior network suitable for generating the objectness prior maps of FIG. 3. A 3×3×2 convolutional layer 354 operates on the respective rf-map n 352. This is followed by a softmax or similar normalization function 356 to indicate the existence of an object in each default box candidate. The channel number of objectness prior maps (denoted as A in FIG. 6) is 10, as there are 10 default boxes at each location. As shown the structure of the objectness prior network is that rf-map n is applied to a 3×3×2 convolution that is applied to a softmax with 10 output feature maps.

As the reverse connection can generate multiple feature maps with different scales, the distribution of the boxes may be designed so that specific feature map locations can be learned to be responsive to particular scales of objects. Denoting the minimum scale with $S_{min}$, the scales $S_k$ of boxes at each feature map k are set forth in Equation 1.

$$S_k=\{(2k-1)\times s_{min}, 2k\times s_{min}\}, k\in\{1,2,3,4\} \qquad \text{Eq. 1}$$

Different aspect ratios {⅓, ½, 1, 2, 3} may also be imposed for the default boxes. The width and height of each box are computed with respect to the aspect ratio. In this example, there are in total, 2 scales and 5 aspect ratios at each feature map location. The $S_{min}$ is 1/10 of the input size (e.g., 32 pixels for a 320×320 model). By combining predictions for all default boxes with different scales and aspect ratios, a diverse set of predictions is generated, covering various object sizes and shapes.

While default boxes with different scales and aspect ratios are considered from many feature maps, only a tiny fraction of the boxes cover objects. In other words, the ratio between object and non-object samples is seriously imbalanced (e.g. 1:10,000). Region-based methods overcome this problem by region proposals. In contrast, the described Objectness Prior Network (OPN) guides the search of objects, without generating any region proposals.

Object Detection Network

The OPN described above is designed to scan a negative sample space. The object detection network (ODN) classifies regions that have high objectness prior scores into K+1 categories. K may be set based on the anticipated input images or it may be optimized for a particular data set. As examples K=20 for one dataset and K=80 for a different dataset, plus 1 for the background. The described light-weight inception module is applied to feature maps that are generated with RCP to perform a second-level feature abstraction. In some examples, two inception blocks are added. A suitable architecture for the two inception blocks is shown in FIG. 5.

Figure 5:
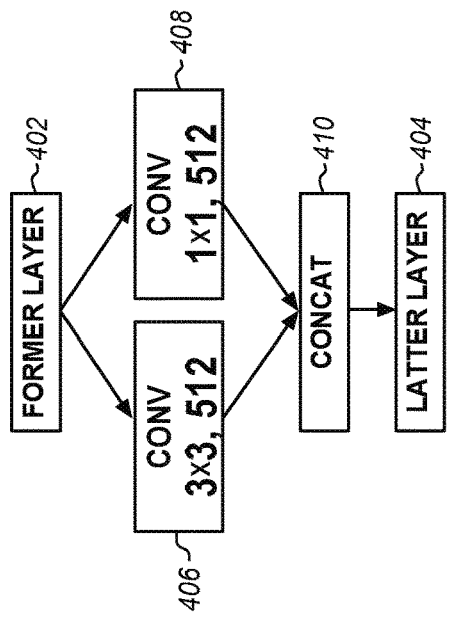
FIG. 5 is a block diagram of an inception block for object detection sub-network according to an embodiment.

FIG. 5 is a block diagram of an inception block of an ODN for object detection. The inception block is between a former layer 402 (i.e., generating input maps) and a latter layer 404 (i.e., feeding in output maps). For example, the input layer can be convolution 5 106 after reverse connection or convolution 6 108 after reverse connection, or so on. The convolution is done in two blocks 406, 408, which are then concatenated 410 and fed to the latter layer 404.

Figure 6:
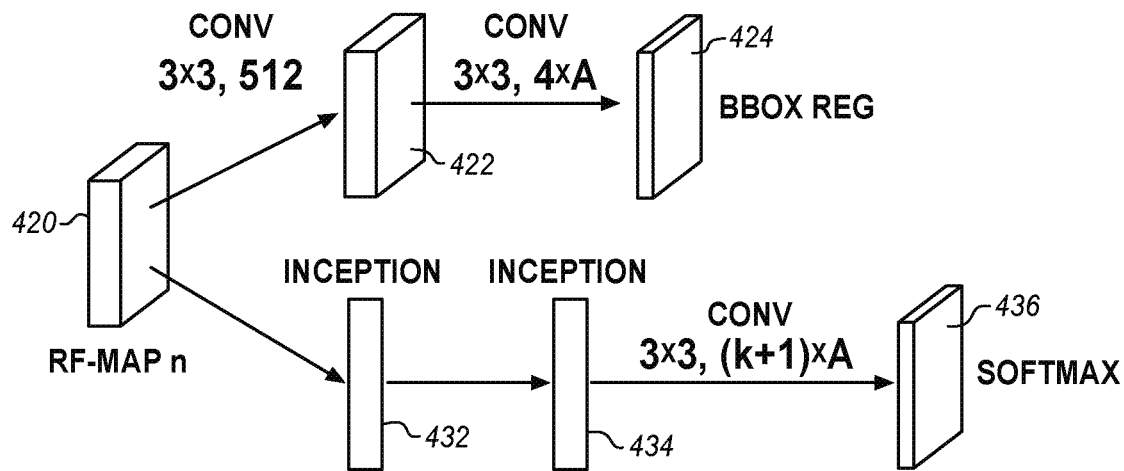
FIG. 6 is block diagram of a sub-network with object detection and bounding box regression according to an embodiment.

FIG. 6 is a block diagram of a sub-network with object detection and bounding box regression modules to operate on the inception output of FIG. 5. The inception outputs 404 are fed into the sub-network shown in FIG. 6 for final object classification and localization. The inception outputs represent the concatenated two blocks 406, 408. The rf-map n 420 from 204 is fed to an upper branch of convolutions 422 to a bounding box regression 424. The convolution layer receives boxes with a size as determined by the layer. In this example, the convolution 422 is 3×3 with 512 channels and the convolutions 424 is 3×3 with 4×A outputs, where A is the channel number of objectness prior maps. As an example, if there are 10 default boxes at each location, then A is 10. For Bounding Box Regression (BBR), the offsets are predicted relative to the default boxes.

In the second branch, there are two inception blocks 432, 434 after the map input 420 for second-level feature extraction. The second level feature extraction is used in the final object detection. The rf-map n 420 is applied to a first inception 432 and a second inception 434 and then the resulting convolution is applied to a softmax or similar function 436. With Softmax, the sub-network outputs a per-class score that indicates the presence of a class-specific instance. Specifically, and in some embodiments, a 3×3×2 convolutional layer is added followed by a Softmax function to indicate the existence of an object in each box.

End-to-End Framework with a Joint Loss Function for Training Object Detector

The Joint FCN (Fully Convolutional Network) described herein combines the RCP with the OPN described above for robust object detection. This is a new end-to-end training method incorporated with a novel Joint Loss Function (JLF) for optimizing the RCP and OPN jointly.

Figure 7:
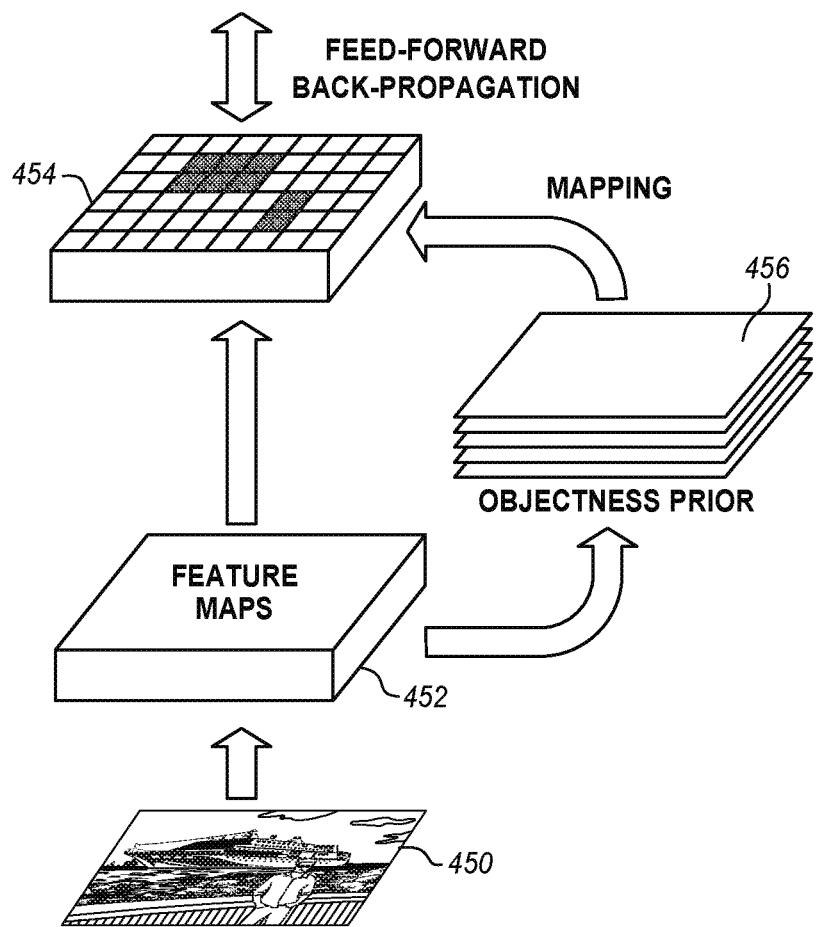
FIG. 7 is a process flow diagram of mapping prior objectness with object detection in training and feed-forward operation according to an embodiment.

FIG. 7 is a process flow diagram of mapping the objectness priors with object detection both in training and feed-forward testing. An image 450 is applied to feature map generation 452. The feature maps are applied to objectness prior 456. The objectness prior is combined with the feature maps to obtain feed-forward back propagation 454. The object detection 454 is aided by the objectness prior 456 both in training and feed-forward testing phases.

For training the network, a binary class label may first be assigned to each candidate region generated on RCP. Next, if the region covers an object, a class-specific label may be assigned to that region. The assignment of labels to bounding boxes may be done in a variety of different ways. In some embodiments a ground truth bounding box is established for each classified object and then overlaps with the ground truth are determined using a Jaccard overlap index. As an example, for each ground truth bounding box, first the box is matched with the candidate regions that have the greatest Jaccard overlap. Second candidate regions of the box are matched to any ground truth that has a Jaccard overlap index higher than some threshold, such as 0.5. This matching strategy helps to ensure that each ground truth box has at least one region box assigned to it. Third, negative labels may be assigned to the boxes with a Jaccard overlap index lower than some threshold, such as 0.3. After these assignments, each box has its objectness label and class-specific label. The network is able to update the class-specific labels dynamically. This may be used to assist object detection with objectness prior at the training phase.

At feedforward time, the network may run both the objectness prior and class-specific detection on mini-batches of images. This is repeated for each mini-batch. At the back-propagation phase, the network first generates the objectness prior, then for detection, selects the objectness scores that are higher than a threshold, $O_p$, for sampling. The extra operations only come from the selection of samples for back-propagation. With a suitable $O_p$ (e.g. $O_p$=0.03), only a small number of samples is selected for updating the detection branch, thus the complexity of the backward pass has been significantly reduced.

For each location, the network may use three sibling output branches. The first output branch outputs an objectness confidence score p={$p_0$, $p_1$}, computed e.g. by a softmax over the 2×A outputs of objectness prior (here, A=10 as there are 10 types of default boxes). The objectness loss may be denoted with $L_{obj}$. The second output branch outputs a bounding box regression loss, denoted by $L_{loc}$. It represents minimizing the smoothed $L_1$ loss between the predicted location offsets t={$t_x$, $t_y$, $t_w$, $t_h$} and the target offsets t*={$t_x$*, $t_y$*, $t_w$*, $t_h$*}. The bounding box regression loss may be determined by regressing the location one time with no class-specific information instead of regressing the offsets for each of the K different classes.

The third output branch outputs a classification loss $L_{cls|obj}$ for each box over all of the K+1 categories. Given the objectness confidence score p, the third output branch first excludes regions whose scores are lower than the threshold $O_p$. Then in the same way that $L_{obj}$, $L_{cls|obj}$, are computed by a softmax over K+1 outputs for each location the probability may also be computed as, $p^{cls|obj}$={$p_0^{cls|obj}$, $p_1^{cls|obj}$, ..., $p_K^{cls|obj}$}.

A new Joint Loss Function (JLF) may use these three output branch results to train the joint FCN end-to-end through optimizing objectness prior, classification and localization in a multi-task manner. Mathematically, the JLF may be defined as set forth in Equation 2.

$$L = \alpha(1/N_{obj})L_{obj} + \beta(1/N_{loc})L_{loc} + (1-\alpha-\beta)(1/N_{cls|obj})L_{cls|obj} \quad \text{Eq. 2}$$

The hyper-parameters α and β balance the three losses. The hyper-parameters may be set to different values as appropriate for the types of images and the nature of the convolutional network and framework. In some cases the values may be set as α=β=⅓.

As mentioned above, only a tiny fraction of the bounding boxes cover objects. The ratio between object and non-object samples is seriously imbalanced in most places e.g. on the order of 1:10,000. The described Objectness Prior Network (OPN) guides the search of objects, without generating any region proposals. A dynamic training strategy may be used to scan the negative space. In some examples, at the training phase, multiple Stochastic Gradient Descent (SGD) mini-batches are constructed from N images chosen uniformly from the training image dataset.

At each mini-batch, for objectness prior, all of the positive samples are selected for training. Negative samples are randomly selected from regions with negative labels such that the ratio between positive and negative samples is 1:3. For detection, first the sample number is reduced according to the objectness prior scores generated at the respective mini-batch. Then all of the positive samples are selected. The negative samples are selected so that the ratio between positive and negative samples is 1:3. Finally, the JLF, e.g. Eq. 2, is trained end-to-end by back-propagation and SGD, which is more efficient at the training phase.

At the feed-forward inference phase, the class-conditional probability and the individual box confidence predictions are multiplied to obtain a class-specific confidence score for each box. This may be presented as shown in Equation 3.

$$p^{cls} = p^{obj} \cdot p^{cls|obj} \quad \text{Eq. 3}$$

The scores encode both the probability of the class appearing in the box and how well the predicted box fits the object. After the final score of each box is generated, the boxes are adjusted according to the bounding box regression outputs. Finally, non-maximum suppression is applied to get the final detection results.

The described system uses the feature maps from multiple layers not just one single layer of a pre-trained CNN model, to classify and localize object instances. As described in some embodiments object detection is performed with multi-scale localization using the feature maps from multiple layers of a pre-trained CNN model.

In some embodiments hard negative example mining is processed with multi-scale feature maps from multiple layers of a pre-trained CNN model. A dedicated objectness scoring network is used to scan and group hard negative examples both in training and in feed-forward testing.

In some embodiments a unified CNN framework is used for processing objectness scoring and object detection, and the whole architecture is built with an end-to-end training method that shares multi-scale semantic features across multiple tasks. The resulting system and techniques are suitable for object classification and detection based visual analytics applications including image search, scene understanding, augmented reality, surveillance, autonomous vehicles, elder care, infant care, etc. The techniques may be deployed on camera platforms and on other camera embedded or wearable devices, e.g. smart phones, tablets, notebooks, phablets, computers, wearable devices, smart-TVs, game-consoles, and web servers.

Figure 8:
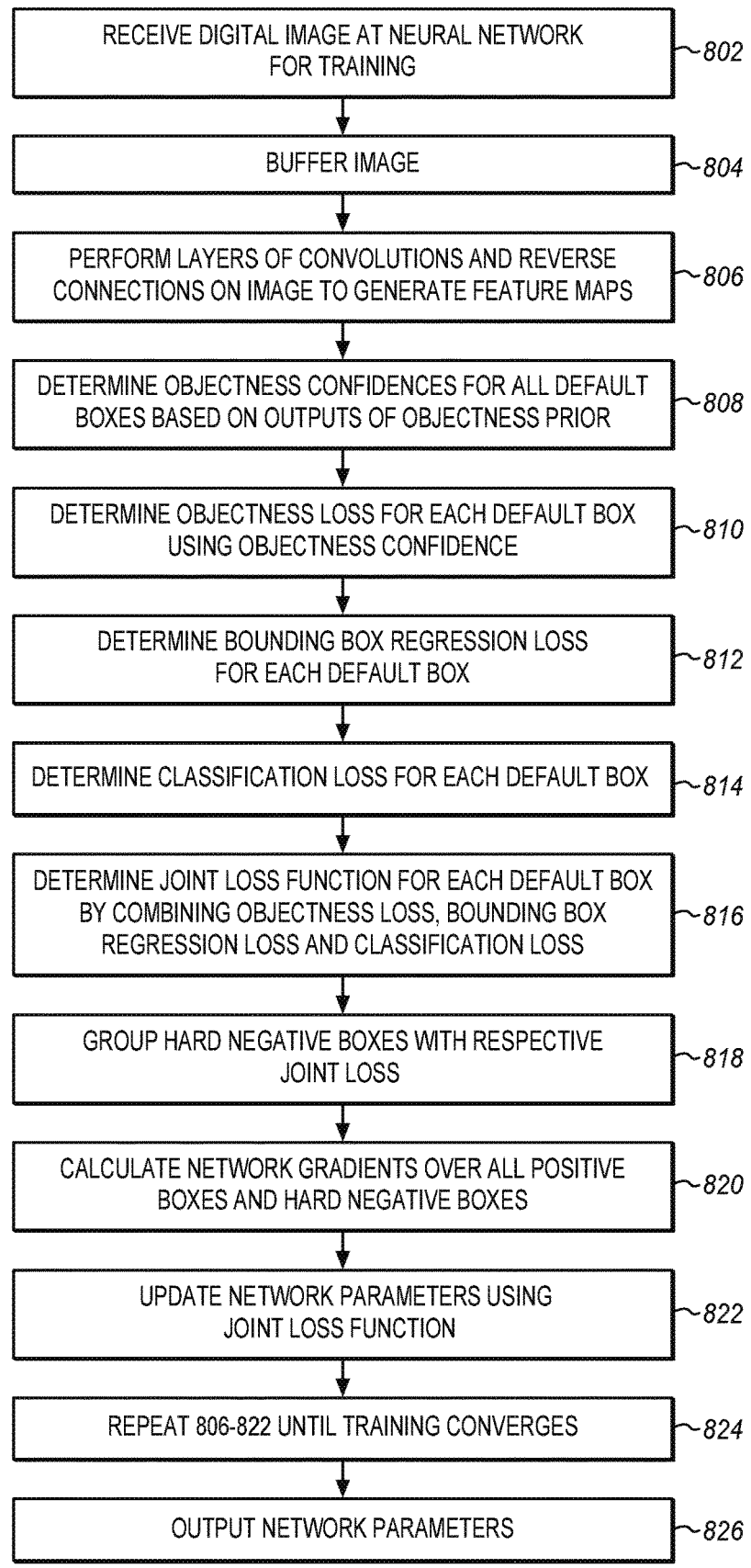
FIG. 8 is a process flow diagram of training of a fully convolutional neural network framework according to an embodiment.

FIG. 8 is a process flow diagram of training the system shown in FIG. 1 using reverse connections and objectness priors. The neural network may have its parameters initialized (e.g., using a Gaussian distribution) before starting a training procedure. There may be additional initialization operations such as initializing network parameters, configuring the neural network and reverse connections, etc. The process flow starts at 802 with receiving a digital image at the neural network for training in object detection. There are typically thousands of images but they are processed individually. In the training phase, the training images have objects that have been identified as to classification and location. The images (e.g., 10,000 images) are split often at random into fixed size batches. For e.g. 10,000 images and 2 images per batch, there will be 5000 batches in total. Operations 806-822 are repeated on each batch size in turns, the complete scanning of all batches (e.g., 5000 iterations) is called a training epoch. Usually, tens of epochs are needed for final convergence regardless of the batch size.

At 804 the image is buffered. At 806 layers of convolutions and reverse connections are performed on the image to generate feature maps.

At 808 objectness confidence is determined based on outputs of an objectness prior operation. As mentioned above, default boxes are generated for each image, then OPN is used to select appropriate bounding boxes from among all of the generated default candidate bounding boxes. The objectness prior operation may be generated using only bounding boxes with detected objects combined with a pre-determined number of randomly selected negative bounding boxes. The negative bounding boxes may be selected randomly or in some order. They may be identified using the classification data of the training set of images. The objectness confidence score may then be determined by applying a softmax or similar function over outputs of the objectness prior results.

At 810 an objectness loss is determined for each bounding box using the objectness confidence. The objectness loss may be determined in any of a variety of different ways. In one example, regions with objectness scores lower than an objectness threshold $O_p$ are excluded and then an objectness probability is computed for each bounding box location using a softmax or similar operation over classification outputs for each bounding box location.

At 812 a bounding box regression loss is determined for each bounding box. The bounding box regression loss may be determined by minimizing smoothed L1 loss between predicted location offsets t={tx, ty, tw, th} and target offsets t*={tx*, ty*, tw*, th*}. In such an embodiment, this may be done quickly by regressing location offsets one time for each bounding box without any class-specific information.

At 814 a classification loss is determined for each bounding box. The classification loss may be determined in any of a variety of different ways. In some embodiments the classification loss $L_{cls|obj}$ is determined for each bounding box over K categories plus the negative category.

At 816 a joint loss function is determined for each bounding box by combining objectness loss, bounding box regression loss and classification loss. As shown in Eq. 2, the combination may be a sum determined by adding objectness loss balanced by a first factor α, the bounding box regression loss balanced by a second factor β, and a classification loss balanced by α-β.

The joint loss function may be trained end-to-end over multiple images by back propagation and stochastic gradient descent. The stochastic gradient descent in some embodiments is performed on mini-batches. Each mini-batch is constructed from N images chosen uniformly from the training dataset of received images.

At 818 hard negative boxes are grouped using the respective joint loss for each default candidate bounding box. In other words the bounding boxes are ranked based on the joint loss result. The greater the loss, the harder the box so that the hardest boxes may be grouped.

At 820 network gradients are calculated over all positive boxes and hard negative boxes. In this context, the positive boxes are those that are known to include an object. The training image set includes identifications of objects in the images. The negative boxes are the boxes that are known to not include an object. At 822 the network parameters are updated accordingly within the default boxes using the joint loss function. In some embodiments, the network parameters are updated using the gradients determined at 820. This includes only the selected bounding boxes from among the many more candidate boxes. Not all of the default candidate bounding boxes (e.g., 20,000) are used to calculate the final joint loss and related gradients, but only the positive boxes and selected hard negative boxes (e.g., 2000 from 20,000) are grouped for updating network parameters).

The generation of network parameters is then repeated at 824 from operation 806, performing the convolutions, through 822, updating the network parameters, until the training converges to a desired degree. After the training is sufficiently converged, the training is completed and at 826 the network parameters are output.

For the object detection after training, there may be then an operation of detecting objects by determining an objectness for each of the feature maps. The objects may be detected at a feed-forward inference phase after the training. For training, there is a ground truth that includes an identification of objects in the images. This is not available after training. The feed forward inference phase includes multiplying a class-conditional probability and individual box confidence prediction to obtain class-specific confidence scores for each box. The boxes may then be adjusted according to the bounding box regression output after class-specific confidence score of each box is generated. A non-maximum suppression may be applied to the final score of each box to further improve accuracy.

Figure 9:
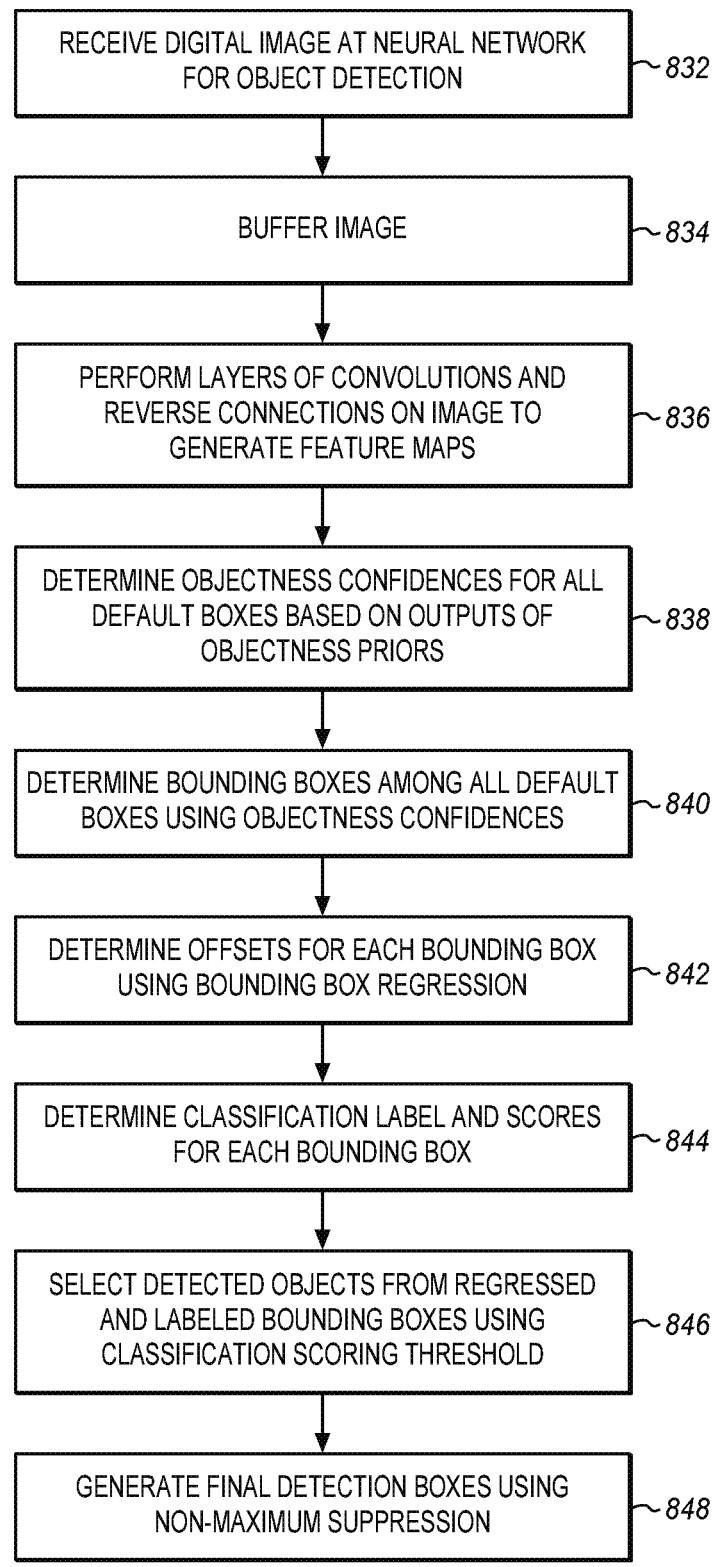
FIG. 9 is a process flow diagram of feed-forward operation of a fully convolutional neural network framework according to an embodiment.

FIG. 9 is a process flow diagram of object detection. This object detection is performed after training for the real application to detect and classify unknown objects. In this feed-forward phase, the loss determinations are no longer required. The objectness prior or classification scores are used to indicate the existence of an object or an object category. The offsets or object box offsets are also used.

The object detection begins at 832 with receiving a digital image at the neural network for object detection. For object detection in real applications, the input digital image is usually only one image (unlike training in which there are image batches). The image may be a single static image or a frame of a video or input captured by a local camera. At 834 the image is buffered and at 836 layers of convolutions and reverse connections are performed on the image to generate feature maps. These operations are very similar to those discussed above with respect to FIG. 8.

At 838 objectness confidences are for all default boxes are determined based on the outputs of the objectness priors. At 840 the bounding boxes are selected or determined from among all of the candidate default boxes using objectness confidences. These operations may be done in a similar manner as in the example of FIG. 8.

At 842 the offsets are determined for each bounding box using bounding box regression. The offsets and scores are then used at 844 to determine classification labels and scores for each of the selected bounding boxes. At 846 detected objects may be selected from regressed and labeled bounding boxes using the classification scoring threshold. This then results at 848 in the final detection boxes being generated using non-maximum suppression. This result is similar to that of FIG. 1 in which bounding boxes are drawn around three detected objects and the objects are classified as two boats and a person.

Figure 10:
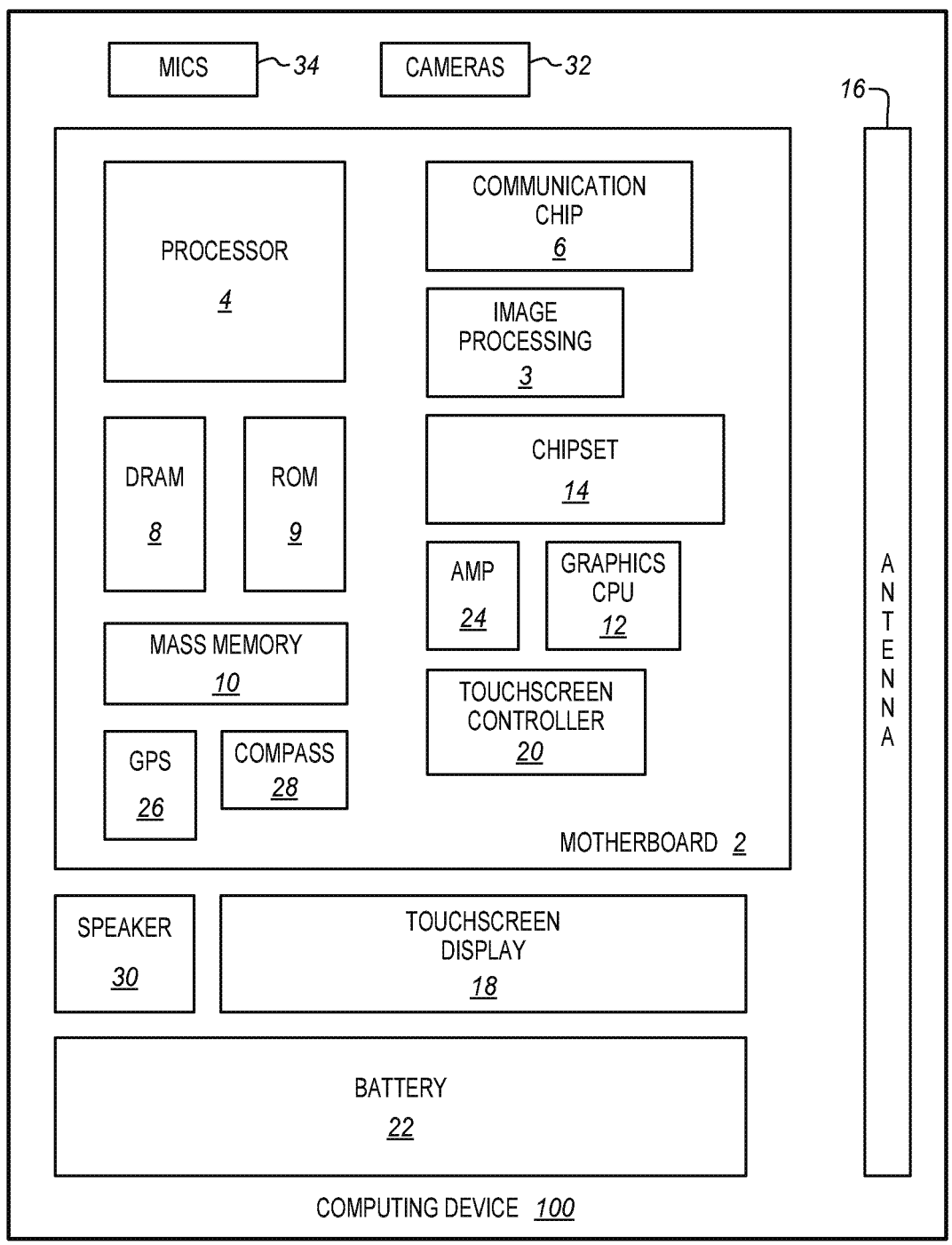
FIG. 10 is a block diagram of a computing device incorporating object detection according to an embodiment.

FIG. 10 is a block diagram of a single computing device 100 in accordance with one implementation. The computing device 100 houses a system board 2. The board 2 may include a number of components, including but not limited to a processor 4 and at least one communication package 6.

The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G. and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 are coupled to an image processing chip 3 to perform format conversion, coding and decoding, noise reduction and 3D mapping as described herein. The processor 4 is coupled to the image processing chip to drive the processes, set parameters, etc.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers. CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a digital training image at a neural network for object detection, buffering the image, performing a plurality of layers of convolutions and reverse connections on the image to generate a plurality of feature maps, determining an objectness confidence for each of a plurality of default candidate bounding boxes based on outputs of an objectness prior operation, determining an objectness loss for each candidate bounding box using the respective objectness confidence, determining a bounding box regression loss for each candidate bounding box, determining a classification loss for each candidate bounding box, determining a joint loss function for each candidate bounding box by combining the objectness loss, the bounding box regression loss and the classification loss, calculating network gradients over positive boxes and negative boxes, wherein the positive boxes contain an object and the negative boxes do not contain an object, updating network parameters within candidate bounding boxes using the joint loss function, repeating performing the convolutions through to updating network parameters for a plurality of additional images until the training converges, and outputting network parameters for object detection based on the training images.

In further embodiments calculating network gradients comprises restricting the negative boxes to those having a joint loss function greater than a loss threshold and calculating network gradients only of negative boxes that meet the restriction.

In further embodiments determining a classification loss comprises determining a classification loss for each bounding box over categories plus a negative category.

In further embodiments determining a bounding box regression loss comprises minimizing a smoothed L1 loss between the predicted location and the target offsets.

In further embodiments determining a bounding box regression loss comprises regressing location offsets one time for each bounding box without any class-specific information.

In further embodiments selecting detected objects comprises converting the joint loss function into objectness probability scores for each box and selecting using the probability scores.

In further embodiments determining an objectness loss includes excluding regions with objectness scores lower than an objectness threshold, and computing an objectness probability for each bounding box location using a softmax operation over classification outputs for each bounding box location.

In further embodiments determining an objectness confidence score comprises applying a softmax function over the outputs of an objectness prior result.

In further embodiments the objectness prior is generated using only bounding boxes with detected objects combined with a pre-determined number of randomly selected negative bounding boxes.

In further embodiments determining a joint loss function comprises adding the objectness loss balanced by a first factor, the bounding box regression loss balanced by a second factor, and the classification loss balanced by the first factor less the second factor.

Further embodiments include training the joint loss function end-to-end by back propagation and stochastic gradient descent.

In further embodiments the stochastic gradient descent is performed on mini-batches and wherein each mini-batch is constructed from N images chosen uniformly from a dataset of received images.

Further embodiments include detecting objects at a feedforward inference phase, the feed forward inference phase including multiplying a class-conditional probability and an individual box confidence predictions to obtain a class-specific confidence score for each box.

Further embodiments include adjusting the boxes according to the bounding box regression output after the class-specific confidence score of each box is generated.

Further embodiments include applying non-maximum suppression to the final score of each box.

Some embodiments pertain to a method of detecting an object in an image that includes receiving a digital training image at a neural network for object detection, buffering the image, performing a plurality of layers of convolutions and reverse connections on the image to generate a plurality of feature maps, determining an objectness confidence for each of a plurality of candidate bounding boxes based on outputs of an objectness prior operation, selecting bounding boxes from among the candidate bounding boxes using the objectness confidence, determining offsets for each selected bounding box using bounding box regression, determining object classification labels and scores for each selected bounding box, and selecting detected objects from the regressed and labeled bounding boxes.

Some embodiments pertain to an apparatus that includes a buffer to receive a digital training image, and a neural network for object detection, the network performing a plurality of layers of convolutions and reverse connections on the image to generate a plurality of feature maps, determining an objectness confidence for each of a plurality of default candidate bounding boxes based on outputs of an objectness prior operation, determining an objectness loss for each candidate bounding box using the respective objectness confidence, determining a bounding box regression loss for each candidate bounding box, determining a classification loss for each candidate bounding box, determining a joint loss function for each candidate bounding box by combining the objectness loss, the bounding box regression loss and the classification loss, calculating network gradients over positive boxes and negative boxes, wherein the positive boxes contain an object and the negative boxes do not contain an object, updating network parameters within candidate bounding boxes using the joint loss function, repeating performing the convolutions through to updating network parameters until the training converges, and outputting network parameters for object detection based on the training images.

In further embodiments determining a joint loss function comprises adding the objectness loss balanced by a first factor, the bounding box regression loss balanced by a second factor, and the classification loss balanced by the first factor less the second factor.

Some embodiments pertain to a computing system that includes a camera to capture an image, a buffer to receive the captured image, and a neural network, the network performing a plurality of layers of convolutions and reverse connections on the image to generate a plurality of feature maps, determining an objectness confidence for each of a plurality of candidate bounding boxes based on outputs of an objectness prior operation, selecting bounding boxes from among the candidate bounding boxes using the objectness confidence, determining offsets for each selected bounding box using bounding box regression, determining object classification labels and scores for each selected bounding box, and selecting detected objects from the regressed and labeled bounding boxes.

Further embodiments include a processor to perform an action based on at least one detected object.

What is claimed is:

1. A training method comprising:
   receiving a digital training image at a neural network that is to perform object detection;
   buffering the digital training image;
   performing a plurality of layers of convolutions and reverse connections on the digital training image to generate a plurality of feature maps;
   determining an objectness confidence for each of a plurality of default candidate bounding boxes based on outputs of an objectness prior operation;
   determining an objectness loss for each candidate bounding box using the respective objectness confidence;
   determining a bounding box regression loss for each candidate bounding box;
   determining a classification loss for each candidate bounding box;
   determining a joint loss function for each candidate bounding box by combining the objectness loss, the bounding box regression loss and the classification loss;

calculating network gradients over positive boxes and negative boxes, wherein the positive boxes contain an object and the negative boxes do not contain an object;

updating network parameters within candidate bounding boxes using the joint loss function;

repeating performing the convolutions through to updating network parameters for a plurality of additional images until the training converges; and outputting network parameters for object detection based on training images.

2. The method of claim 1, wherein the calculating of the network gradients includes restricting the negative boxes to those having the joint loss function greater than a loss threshold and calculating network gradients only of negative boxes that meet the restriction.

3. The method of claim 1, wherein the determining of the classification loss includes determining the classification loss for each bounding box over categories plus a negative category.

4. The method of claim 1, wherein the determining of the bounding box regression loss includes minimizing a smoothed L1 loss between predicted location offsets and target offsets.

5. The method of claim 1, wherein the determining of the bounding box regression loss includes regressing location offsets one time for each bounding box without any class-specific information.

6. The method of claim 1, further including selecting detected objects by converting the joint loss function into objectness probability scores for each box and selecting the detected objects using the objectness probability scores.

7. The method of claim 1, wherein the determining of the objectness loss includes:

excluding regions with objectness scores lower than an objectness threshold; and computing an objectness probability for each bounding box location using a softmax operation over classification outputs for each bounding box location.

8. The method of claim 1, wherein the determining of the objectness confidence includes applying a softmax function over the outputs of the objectness prior operation.

9. The method of claim 1, wherein the determining of the joint loss function includes adding the objectness loss balanced by a first factor, the bounding box regression loss balanced by a second factor, and the classification loss balanced by the first factor less the second factor.

10. The method of claim 1, further including training the joint loss function end-to-end by a back propagation and a stochastic gradient descent.

11. The method of claim 1, further including detecting objects at a feed-forward inference phase, the feed-forward inference phase including multiplying a class-conditional probability and an individual box confidence predictions to obtain a class-specific confidence score for each box.

12. The method of claim 8, wherein the objectness prior operation is generated using only bounding boxes with detected objects combined with a pre-determined number of randomly selected negative bounding boxes.

13. The method of claim 10, wherein the stochastic gradient descent is performed on mini-batches and wherein each mini-batch is constructed from N images chosen uniformly from a dataset of received images.

14. The method of claim 11, further including adjusting each box according to a bounding box regression output after the class-specific confidence score of each box is generated.

15. The method of claim 11, further including applying non-maximum suppression to a final score of each box.

16. A method of detecting an object in an image, the method comprising:

receiving a digital training image at a neural network that is to perform object detection;

buffering the digital training image;

performing a plurality of layers of convolutions and reverse connections on the digital training image to generate a plurality of feature maps;

determining an objectness confidence for each of a plurality of candidate bounding boxes based on outputs of an objectness prior operation;

selecting bounding boxes from among the candidate bounding boxes using the objectness confidence;

determining offsets for each selected bounding box using bounding box regression;

determining object classification labels and scores for each selected bounding box; and selecting detected objects from the regressed and labeled bounding boxes.

17. An apparatus comprising:

a buffer to receive a digital training image; and at least one hardware processor to implement a neural network, the neural network to:

perform a plurality of layers of convolutions and reverse connections on the digital training image to generate a plurality of feature maps;

determine an objectness confidence for each of a plurality of default candidate bounding boxes based on outputs of an objectness prior operation;

determine an objectness loss for each candidate bounding box using the respective objectness confidence;

determine a bounding box regression loss for each candidate bounding box;

determine a classification loss for each candidate bounding box;

determine a joint loss function for each candidate bounding box by combining the objectness loss, the bounding box regression loss and the classification loss;

calculate network gradients over positive boxes and negative boxes, wherein the positive boxes contain an object and the negative boxes do not contain an object;

update network parameters within candidate bounding boxes using the joint loss function;

repeat performing the convolutions through to updating network parameters until the training converges; and output network parameters for object detection based on training images.

18. The apparatus of claim 17, wherein the neural network is to determine the joint loss function by adding the objectness loss balanced by a first factor, the bounding box regression loss balanced by a second factor, and the classification loss balanced by the first factor less the second factor.

19. A computing system comprising:

a camera to capture an image; a buffer to receive the image; and at least one hardware processor to implement a neural network, the neural network performing a plurality of layers of convolutions and reverse connections on the image to:

generate a plurality of feature maps;
determine an objectness confidence for each of a plurality of candidate bounding boxes based on outputs of an objectness prior operation;
select bounding boxes from among the candidate bounding boxes using the objectness confidence;
determine offsets for each selected bounding box using bounding box regression;
determine object classification labels and scores for each selected bounding box; and
select detected objects from among the regressed and labeled bounding boxes.

20. The computing system of claim 19, further including a processor to perform an action based on at least one detected object.

* * * * *